Aug. 21, 1923.
L. ZOERGIEBEL
1,465,505
DRIVING MECHANISM FOR COMBINED COFFEE GRINDERS AND MEAT CHOPPERS
Filed July 14, 1919
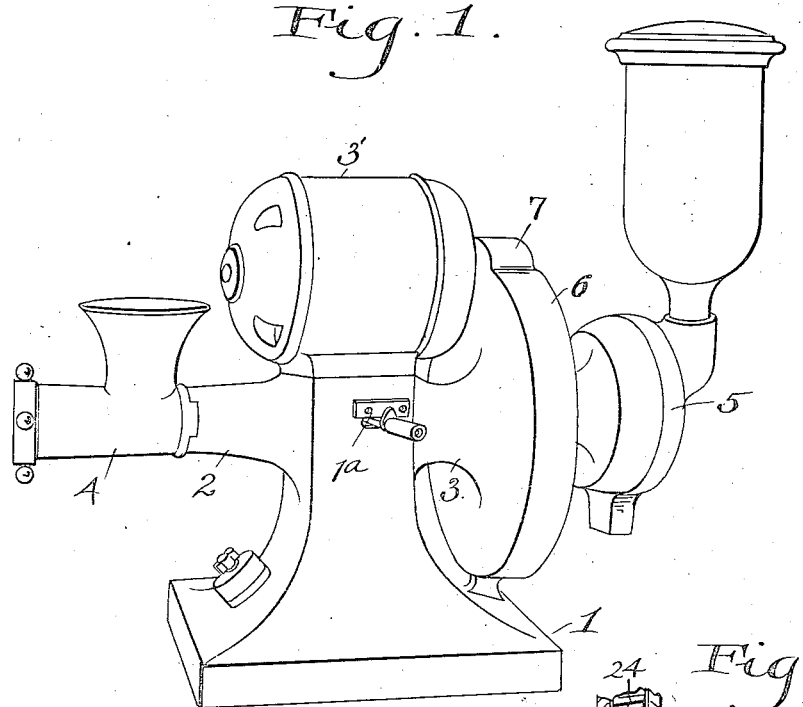
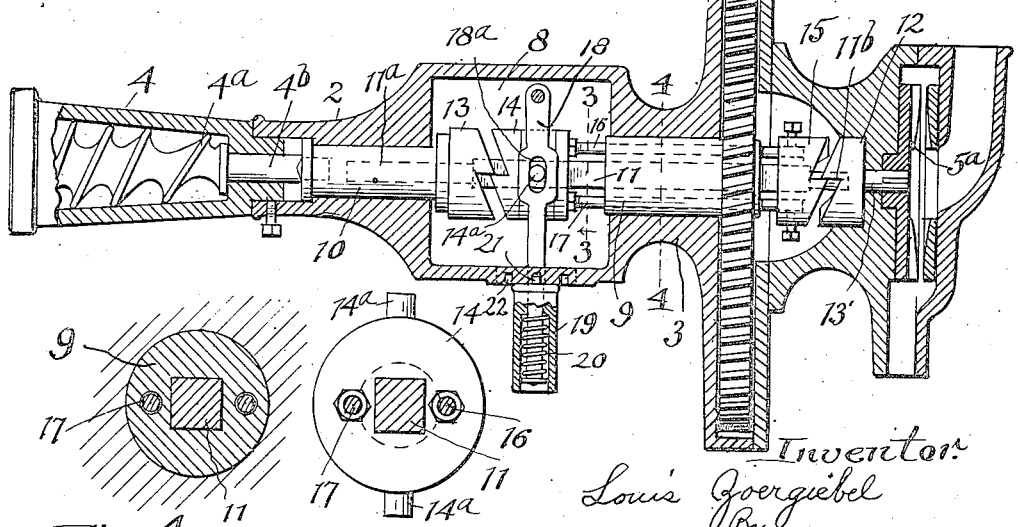

Patented Aug. 21, 1923.

1,465,505

UNITED STATES PATENT OFFICE.

LOUIS ZOERGIEBEL, OF CLEVELAND, OHIO, ASSIGNOR TO THE CLEVELAND ELECTRIC MACHINE AND MANUFACTURING COMPANY, OF CLEVELAND, OHIO, A CORPORATION OF OHIO.

DRIVING MECHANISM FOR COMBINED COFFEE GRINDERS AND MEAT CHOPPERS.

Application filed July 14, 1919. Serial No. 310,656.

*To all whom it may concern:*

Be it known that I, LOUIS ZOERGIEBEL, a citizen of the United States, residing at Cleveland, in the county of Cuyahoga and State of Ohio, have invented a certain new and useful Improvement in Driving Mechanisms for Combined Coffee Grinders and Meat Choppers, of which the following is a full, clear, and exact description.

The purpose of the present invention is to provide a machine in which two power driven instrumentalities may be driven from a common power source.

The construction further is so organized that the instrumentalities may be independently driven or simultaneously driven.

More specifically, the invention relates to a combination machine in which a coffee grinding apparatus and a meat chopping apparatus are mounted upon a common pedestal or base having a single motor as the driving agency, together with suitable transmission mechanism including clutch mechanism so that at will the grinder and chopper may be simultaneously or independently operated.

Generally speaking, the invention may be said to comprise the elements and the combinations thereof set forth in the accompanying claims.

Reference should be had to the accompanying drawings forming a part of this specification in which Fig. 1 is a perspective view showing the machine in elevation; Fig. 2 is a sectional elevation of a portion of the machine; Fig. 3 is a section on the line 3—3 of Fig. 2; Fig. 4 is a section upon the line 4—4 of Fig. 2.

Referring to the drawings, 1 indicates a pedestal which has extending arms 2 and 3. At the top of the pedestal there is mounted a motor 3'.

Upon the arm 2 there is mounted a meat chopper 4 and at the opposite end of the machine there is mounted a coffee grinding apparatus which is generally indicated at 5.

Upon the part 3 which has just been described there is an enlarged casing indicated at 6 having an extension indicated at 7, which parts 6 and 7 form a housing for containing driving gears by which the motor drives the chopper and the grinder.

Referring more particularly to Fig. 2, it will be seen that the pedestal 1 has a hollow interior portion which is indicated at 8 and the parts 2 and 3 have axial openings which are adapted to receive and support parts of the driving mechanism.

The opening through the part 3 receives a sleeve 9, the sleeve having a bearing in the part which supports it.

The opening through the part 2 receives another sleeve 10 and this sleeve has a bearing in the part which supports it.

The sleeve 9 is provided with a squared opening at the central portion thereof through which extends the squared shaft 11. This shaft at one end is formed with a rounding portion 11$^a$ which extends into a suitable opening formed in the sleeve 10 thereby forming a support for the end of the shaft 11 but the shaft 11 has no driving connection with the sleeve 10. The opposite end of the shaft 11 to that which has just been described is also formed with a rounding portion, as indicated at 11$^b$. This rounded portion finds support in a socket which is formed in the clutch member 12. The portion 11$^b$ has no driving relationship with respect to the clutch collar 12 being merely supported therein.

The shaft 11 which has been described is stationarily mounted in its bearings and has no shifting or sliding movement, merely being subjected to the turning movement which it receives from the sleeve 9, as will later appear.

Upon the end of the sleeve 10 there is mounted a clutch collar 13 and the clutch member 12 to which reference has previously been made, is mounted upon a short shaft 13' which finds bearing in a portion of the pedestal 1. It should be noted that neither of these clutch elements 12 or 13 have any direct connection with the shaft 11.

Upon the shaft 11 and within the hollow space 8 in the pedestal there is mounted a clutch collar 14. This clutch collar has a squared opening which engages with the squared shaft 11 as indicated in Fig. 3 so that as the shaft 11 is rotated the clutch collar is also rotated.

Adjacent the opposite end of the shaft 11 to that which has just been described, there is mounted a clutch collar 15. The clutch collar 15 has a squared opening through which passes the squared portion of the shaft 11, so that the clutch collar 15 is also rotated as the shaft 11 rotates. The clutch collars 14 and 15 are connected to each other by means of rods, in the present instance two rods are used as indicated at 16 and 17, although it will be apparent that the number of rods is not material or important. These rods may be secured to the clutch collars 14 and 15 in any desired manner. The rods which have just been described pass through suitable openings formed in the sleeve 9. These openings are larger than the diameter of the rods employed for the purpose of providing clearance, thereby enabling the rods to easily slide within the openings in the sleeve 9.

It will be apparent from the foregoing description that the clutch members 14 and 15 must move together, and further attention is called to the fact that the rods 16 and 17 provide no driving connection, but merely are employed for the purpose of shifting the clutch collars.

The clutch collar 14 has associated therewith a lever 18 which is suitably pivoted to a fixed portion of the pedestal within the hollow portion 8 of the pedestal. The lever extends through a slot such as indicated at 1ª in Fig. 1 and upon the outside is provided with a handle 19. This handle is adapted to slide upon the extending portion of the lever 18 and is connected to the lever by means of a spring such as indicated at 20, the action of the spring being to urge the handle 19 against the outside surface of the pedestal. The handle 19 is provided with a projection 21 which is adapted to cooperate with any one of three notches, one of the notches being indicated at 22.

Connection between the lever 18 and the clutch collar 14 is effected by providing the lever with a slot 18ª and by providing the clutch collar with extensions 14ª carried by a ring rotatable in a groove in the periphery of the collar 14 as is common practice.

While we have referred to the lever 18 as a single lever, it will be understood that usually this lever will be formed as a bifurcated lever having one arm extending above the clutch collar 14 and the other arm extending below. This detail of construction, however, is immaterial, as any suitable lever may be employed for moving the sleeve 14.

The clutch collars 12, 13, 14 and 15 are upon their adjacent faces provided with suitable clutch teeth, so that when the clutch teeth are moved into engagement, a driving connection is effected.

The adjustment of the clutch collars 14 and 15 with respect to the clutch collars 12 and 13 is such that when the collars 14 and 15 are moved to their extreme left hand position (this designation having reference to the showing in the drawing) driving relationship is effected between the shaft 11 and the sleeve 10. Under these conditions the clutch collar 12 is not engaged.

When the clutch collars 14 and 15 are moved to their extreme right hand position (having reference to the showing in the drawing) the clutch collar 12 is driven from the shaft 11 and the clutch collar 13 is not in engagement.

When, however, the clutch collars 14 and 15 are in intermediate position, which is shown in Fig. 2 of the drawing, these clutch collars are in partial engagement with each of the clutch collars 12 and 13 so that both of the clutch collars 12 and 13 are driven.

The respective positions of the clutch collars which have just been discussed are determined by the position of the handle 19, the projection 21 upon this handle being moved into engagement with the proper notch 22 for effecting the desired driving relationship. It should be noted in passing that when the projection 21 upon the handle 19 engages in any one of the three notches 22, the lever 18 is locked thereby maintaining the clutch parts in their adjusted position.

The sleeve 9 has secured thereto a gear 24, which gear is suitably connected with the shaft of the motor 3, therefore as the motor drives the gear 24, power is transmitted to the sleeve 9, thence to the shaft 11 and from the shaft 11 to either or both of the clutch collars 12 and 13, in accordance with the adjustment of the lever 18.

The meat chopping apparatus may of course be of any desired type, but in any event the driving portion of that apparatus which in the present instance is represented by the screw 4ª is suitably connected with the sleeve 10, in this instance the shaft 4ᵇ which forms a part of the screw 4ª is provided with a squared end which points in a square socket in the sleeve 10.

The coffee grinding apparatus may also be of any desired style or type, but in any event the driven part which in the present instance is represented by the burr 5ª is connected to the short shaft 13′ which in turn is connected with the clutch collar 12.

Having described my invention, I claim—

1. The combination of a rotatable sleeve, a journal in which said sleeve is mounted, means for rotating the sleeve, a shaft extending through said sleeve connected with the sleeve so as to turn therewith, a plurality of slidable clutch elements mounted to slide upon the shaft and turn therewith, a driven instrumentality located adjacent each end of the sleeve, a clutch element associated with each instrumentality and means for shifting said slidable clutch elements.

2. The combination with a sleeve, a bearing for the sleeve, means for driving the sleeve, a shaft extending through said sleeve and connected with the sleeve to rotate therewith, a plurality of slidable clutch elements mounted to slide upon the shaft to turn therewith, means for connecting the said slidable clutch elements so that they are relatively fixed and movable together, a driven instrumentality located adjacent each end of the sleeve, a clutch element associated with each instrumentality and means for shifting said slidable clutch elements.

3. The combination with a sleeve, a bearing for said sleeve, means for driving the sleeve, a shaft extending through the sleeve and rotatable therewith, a plurality of slidable clutch elements mounted to slide upon the shaft to turn therewith, members joining the said slidable clutch elements, said elements extending through openings in the sleeve, a driven instrumentality located adjacent each end of the sleeve, a clutch element associated with each instrumentality and means for shifting said slidable clutch elements.

4. The combination with oppositely disposed clutch elements, bearings in which said clutch elements are mounted, a shaft, the end portions of said shaft being mounted in the said clutch elements but unsecured thereto, a sleeve through which said shaft extends so that the sleeve is intermediate the ends of the shaft, a bearing in which said sleeve is mounted, means for driving the said sleeve, a pair of oppositely disposed slidable clutch elements mounted to slide upon the shaft and turn therewith, a driven instrumentality associated with each of the first mentioned clutch elements and means for shifting said slidable clutch elements to effect driving relationship between the sliding clutch elements and the first mentioned clutch elements.

5. The combination of oppositely disposed clutch elements, bearings for said clutch elements, of a shaft, the opposite ends of said shaft being mounted in said clutch elements but unsecured thereto, a sleeve surrounding a portion of said shaft, the sleeve and the shaft being connected to rotate together, means for driving the said sleeve, a bearing in which said sleeve is mounted, a pair of oppositely disposed slidable clutch elements mounted to slide upon the said shaft and turn therewith, means for connecting the said slidable clutch elements to hold them in fixed relationship and move them together, each of the first mentioned clutch elements being associated with a driven instrumentality and each of the slidable clutch elements being associated with one of the first mentioned clutch elements and means for shifting the slidable clutch elements.

6. In combination a clutch element, a driven instrumentality, means connecting the clutch element with the driven instrumentality, a second clutch element, a second driven instrumentality, means connecting the second clutch element with the second instrumentality, a shaft, the ends of said shaft having a bearing in the said clutch elements but unsecured thereto, means for driving the shaft intermediate its ends, a pair of oppositely disposed slidable clutch elements mounted to slide upon the shaft and turn therewith, each slidable clutch element being associated with one of the first mentioned clutch elements and means for shifting the said slidable clutch elements.

7. In combination, a driven instrumentality, a clutch element associated therewith, a second instrumentality, a second clutch element associated therewith, a shaft, the ends of said shaft having a bearing in the said clutch elements but unsecured thereto, a sleeve surrounding a portion of said shaft intermediate its ends, the sleeves being connected to turn with the shaft, means for driving the sleeve, a pair of oppositely disposed sliding clutch elements mounted to slide upon and turn with the said shaft, members connecting the said slidable clutch elements, said members extending through openings in the said sleeve, each of the said slidable clutch elements being associated with one of the first mentioned clutch elements and means for shifting said slidable clutch elements.

In testimony whereof, I hereunto affix my signature.

LOUIS ZOERGIEBEL.